US012436021B2

(12) United States Patent
Kennerson

(10) Patent No.: US 12,436,021 B2
(45) Date of Patent: Oct. 7, 2025

(54) LINKING LUGGAGE SET WITH BUILT-IN SCALE

(71) Applicant: Carol Vernice Kennerson, Matteson, IL (US)

(72) Inventor: Carol Vernice Kennerson, Matteson, IL (US)

( * ) Notice: Subject to any disclaimer, the term of this patent is extended or adjusted under 35 U.S.C. 154(b) by 356 days.

(21) Appl. No.: 18/151,891

(22) Filed: Jan. 9, 2023

(65) Prior Publication Data

US 2023/0221170 A1 Jul. 13, 2023

Related U.S. Application Data

(60) Provisional application No. 63/266,534, filed on Jan. 7, 2022.

(51) Int. Cl.

| | |
|---|---|
| ***G01G 19/58*** | (2006.01) |
| ***A45C 5/14*** | (2006.01) |
| ***A45C 7/00*** | (2006.01) |
| ***A45C 13/26*** | (2006.01) |

(52) U.S. Cl.

CPC ............... *G01G 19/58* (2013.01); *A45C 5/14* (2013.01); *A45C 7/0045* (2013.01); *A45C 2013/267* (2013.01)

(58) Field of Classification Search

CPC ........ G01G 19/58; A45C 5/14; A45C 7/0045; A45C 2013/267; A45C 5/03; A45C 13/262

USPC ........................................................ 190/195

See application file for complete search history.

(56) References Cited

U.S. PATENT DOCUMENTS

| | | | | | | |
|---|---|---|---|---|---|---|
| 1,084,360 | A | * | 1/1914 | Rahm | A45C 7/0045 | 190/108 |
| 3,823,973 | A | * | 7/1974 | Ramer | B65F 1/122 | 220/908 |
| 4,114,234 | A | | 9/1978 | Hogenson | | |
| 4,340,132 | A | * | 7/1982 | Cerna | A45C 13/385 | 280/47.131 |
| 5,099,968 | A | * | 3/1992 | Kikuchi | A45C 5/14 | 220/23.6 |
| 5,374,073 | A | * | 12/1994 | Hung-Hsin | A45C 9/00 | 280/30 |
| 5,971,119 | A | * | 10/1999 | Chi | A45C 13/1084 | 190/110 |

(Continued)

*Primary Examiner* — Nathan J Jenness
*Assistant Examiner* — Justin Caudill
(74) *Attorney, Agent, or Firm* — Dunlap Bennett & Ludwig, PLLC; Anna L. Kinney

(57) ABSTRACT

A modular luggage system includes a luggage module having a luggage body, a first frame with telescoping arms; a second frame extending perpendicularly from the first frame; a handle; and wheels. The frame with telescoping arms connects modules together. The body has a lid that moves between an open position and a closed position. The luggage body and lid define a storage compartment with sidewalls. The first frame and the second frame connect to and extend along a first sidewall and a second sidewall, respectively. The wheels are mounted on the first frame on the first sidewall. The handle slides from and within the second frame. The luggage body has a load sensor built into the first sidewall to measure the weight of the luggage body and its contents. A display attached to the sensor displays the weight on the exterior of the module. No more overweight luggage and carts.

9 Claims, 4 Drawing Sheets

(56) References Cited

U.S. PATENT DOCUMENTS

| | | | | |
|---|---|---|---|---|
| 6,073,737 | A * | 6/2000 | Kang | A45C 7/0045 280/460.1 |
| 6,899,346 | B2 * | 5/2005 | Pfeiffer | A45C 5/143 190/110 |
| 7,151,231 | B2 | 12/2006 | Kamakau | |
| 7,281,615 | B2 | 10/2007 | Siwak et al. | |
| 7,692,107 | B1 | 4/2010 | Shotey et al. | |
| 8,344,271 | B1 | 1/2013 | Falk, Jr. | |
| 8,517,398 | B1 * | 8/2013 | Wilson | B62B 3/02 280/37 |
| 8,853,565 | B2 | 10/2014 | Kritzler | |
| 9,638,572 | B2 | 5/2017 | Moon | |
| 10,076,166 | B2 | 9/2018 | Kim | |
| 10,260,934 | B2 | 4/2019 | Esmail et al. | |
| 2005/0194227 | A1 * | 9/2005 | Mitchell | A45C 7/0072 190/110 |
| 2007/0193786 | A1 | 8/2007 | Pohl et al. | |
| 2008/0308369 | A1 | 12/2008 | Louis, Sr. | |
| 2010/0059323 | A1 * | 3/2010 | Marji | A45C 7/0045 190/18 A |
| 2010/0147642 | A1 * | 6/2010 | Andochick | A45C 5/14 206/315.3 |
| 2010/0236886 | A1 * | 9/2010 | Herold | A45C 7/0045 190/18 A |
| 2012/0186926 | A1 * | 7/2012 | Sheikh | A45C 13/28 190/115 |
| 2012/0241270 | A1 | 9/2012 | Sudu | |
| 2013/0175129 | A1 * | 7/2013 | Rankin | A45C 5/14 190/18 A |
| 2013/0213753 | A1 * | 8/2013 | Salek | A45C 13/30 190/18 A |
| 2013/0333996 | A1 * | 12/2013 | Selvi | A45C 13/1092 190/18 A |
| 2015/0160069 | A1 * | 6/2015 | Kellis | A45C 5/03 177/127 |
| 2015/0292936 | A1 | 10/2015 | Sheikh | |
| 2017/0181514 | A1 * | 6/2017 | Castillo Machado | A45C 13/262 |
| 2017/0188679 | A1 * | 7/2017 | Jacob | A45C 13/10 |
| 2017/0219418 | A1 | 8/2017 | Kellis | |
| 2018/0116361 | A1 * | 5/2018 | Anjum | A45C 5/146 |
| 2019/0037990 | A1 * | 2/2019 | Ayhan | B65D 21/0201 |
| 2019/0142126 | A1 * | 5/2019 | Ying | G01G 19/021 340/5.54 |
| 2020/0309590 | A1 | 10/2020 | Magsitza et al. | |
| 2021/0000235 | A1 | 1/2021 | Osseiran | |

* cited by examiner

LINKING LUGGAGE SET WITH BUILT-IN SCALE

CROSS-REFERENCE TO RELATED APPLICATION

This application claims the benefit of priority of U.S. provisional application No. 63/266,534, filed Jan. 7, 2022, the contents of which are herein incorporated by reference.

BACKGROUND OF THE INVENTION

The present invention relates to luggage and, more particularly, to a linking luggage set with a built-in scale.

Often a traveler cannot tell if luggage is overweight until he or she arrives at the airport. The traveler places the luggage on the airline scale just to be told that the luggage does not make weight. Generally, commercially available luggage does not enable the traveler to determine the packed weight without a commercial scale. Moreover, if the traveler cannot find a cart and has more than one piece of luggage, the traveler must carry and/or tow the luggage, making it very hard to get around in the airport. Commercially available luggage generally does not have a mechanism that interconnects multiple luggage units so that the traveler may easily move them together.

As can be seen, there is a need for a means of determining luggage weight without a commercial scale and a means of interconnecting multiple luggage units.

SUMMARY OF THE INVENTION

In one aspect of the present invention, a modular luggage system comprises a luggage module having: a luggage body with a lid movable between an open position and a closed position, said luggage body and said lid defining a storage compartment therebetween; a first frame coupled to and substantially coextensive with a first sidewall of the luggage body, having telescoping arms extending therefrom; a second frame extending perpendicularly from the first frame, coupled to and substantially coextensive with a second sidewall of the luggage body; a handle slidably housed within the second frame; and wheels rotatably mounted to the first frame.

In another aspect of the present invention, a modular luggage system, comprises a luggage module comprising: a luggage body having at least a first sidewall and a second sidewall perpendicular to the first sidewall, with a lid movable between an open position and a closed position, said luggage body and said lid defining a storage compartment therebetween; wheels rotatably mounted to the first sidewall of the luggage body; a slidably extending handle extending from the second sidewall; a load sensor built into the first sidewall of said luggage body, said load sensor being operative to measure a weight of the luggage body and its contents; and a display operatively coupled to the load sensor, viewable from an exterior of the luggage body, and operative to display the measured weight.

The present invention provides luggage with a built-in digital scale for weighing the contents and bars at the bottom for connecting luggage units together. The inventive luggage removes any doubt about a traveler's luggage being overweight and removes any worry about finding a cart for the luggage.

These and other features, aspects and advantages of the present invention will become better understood with reference to the following drawings, description, and claims.

DETAILED DESCRIPTION OF THE INVENTION

Figure 2:
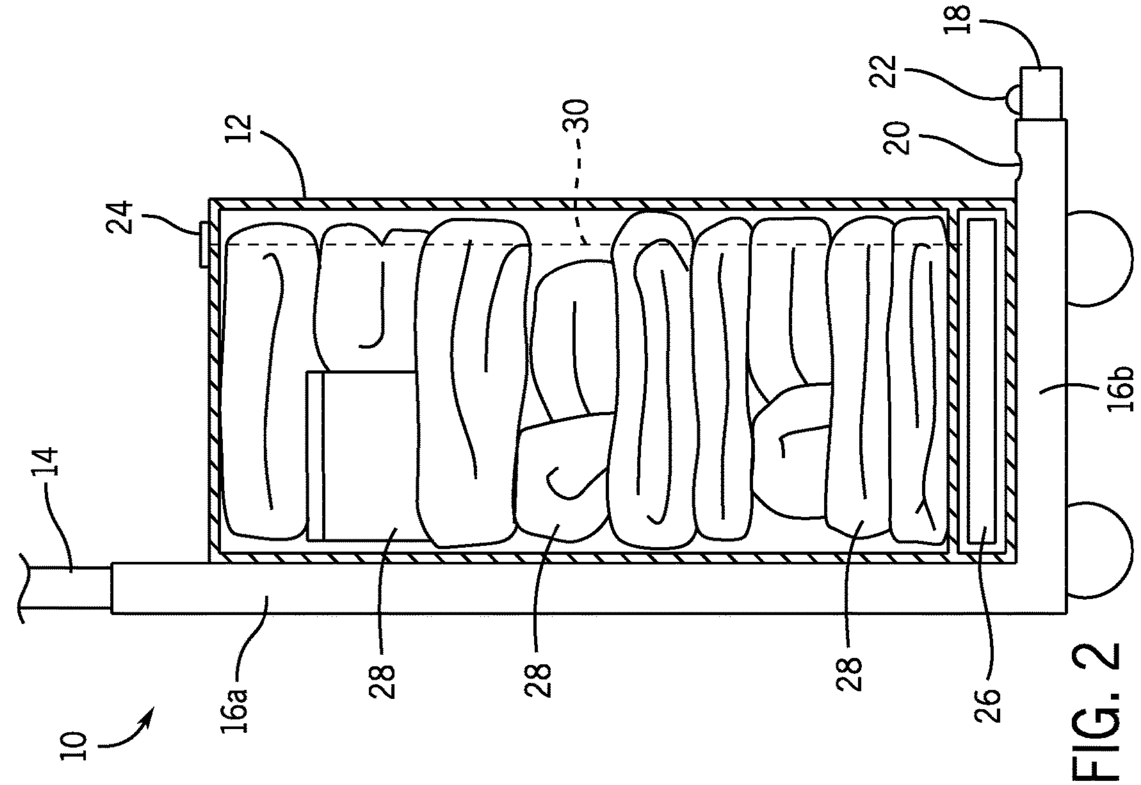
FIG. 2 is a sectional view thereof, taken along line 2-2 of FIG. 1.
Figure 1:
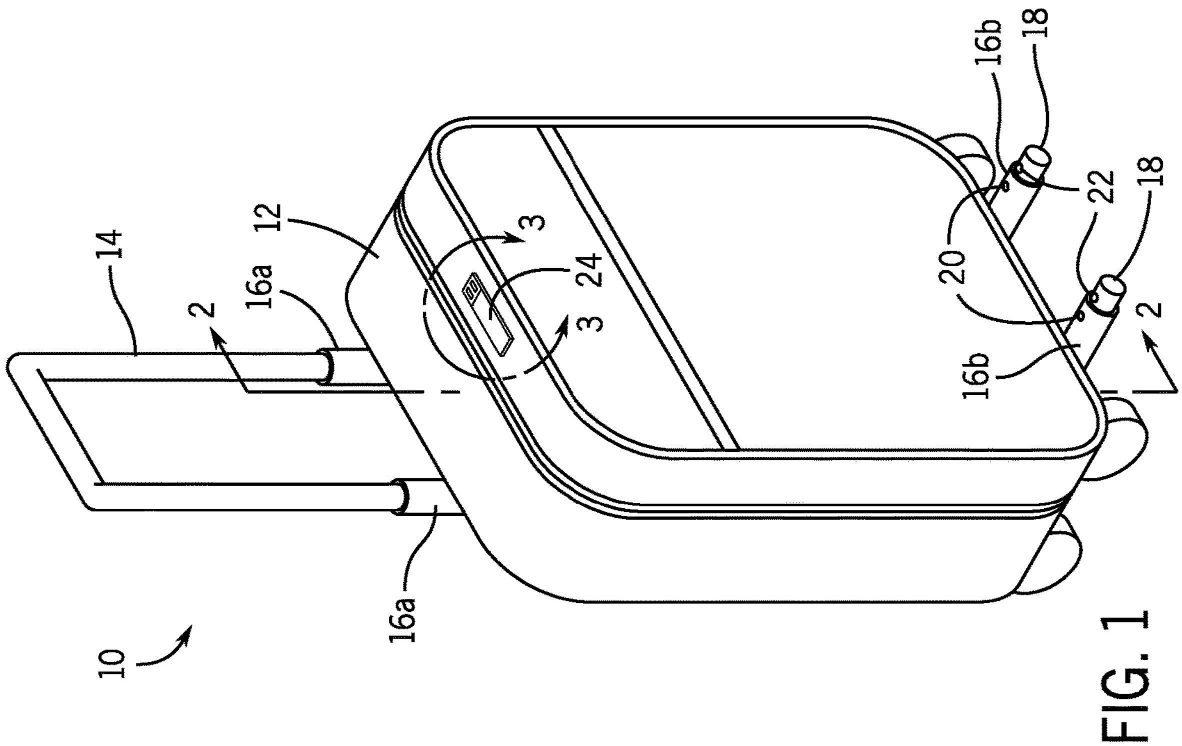
FIG. 1 is a front perspective view of luggage according to an embodiment of the present invention, shown in an unlocked position.
Figure 4:
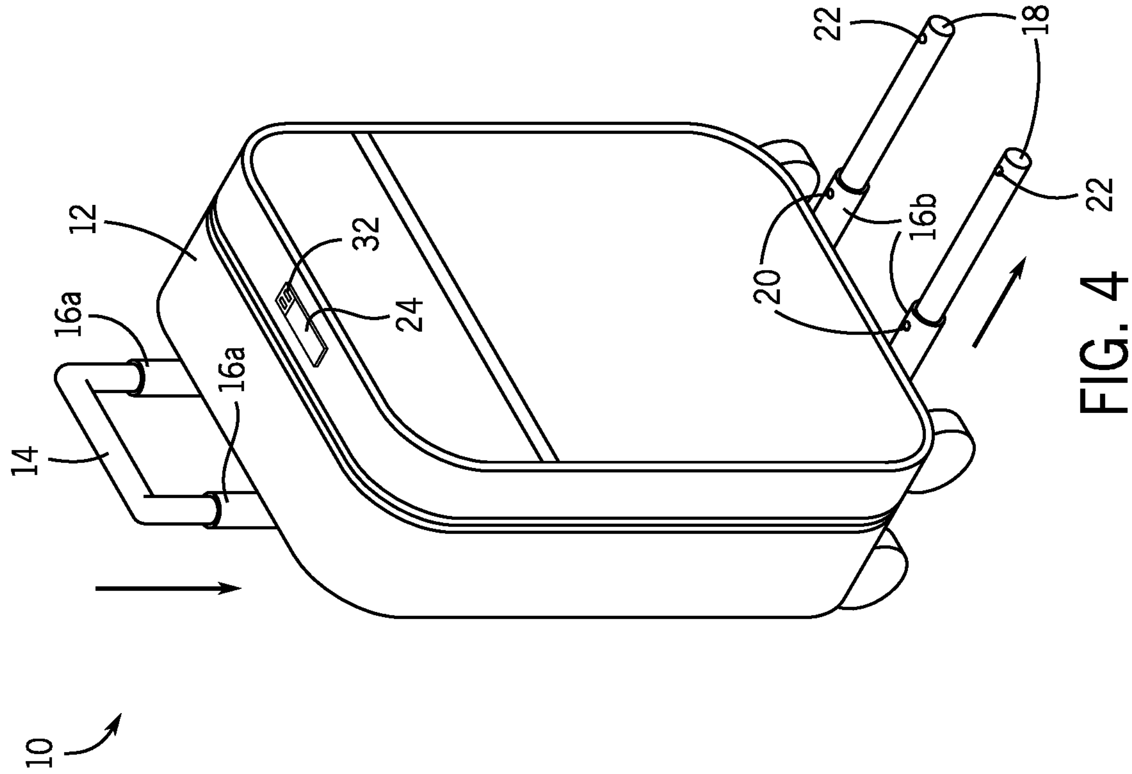
FIG. 4 is a front perspective view thereof, shown in a locked position.
Figure 3:
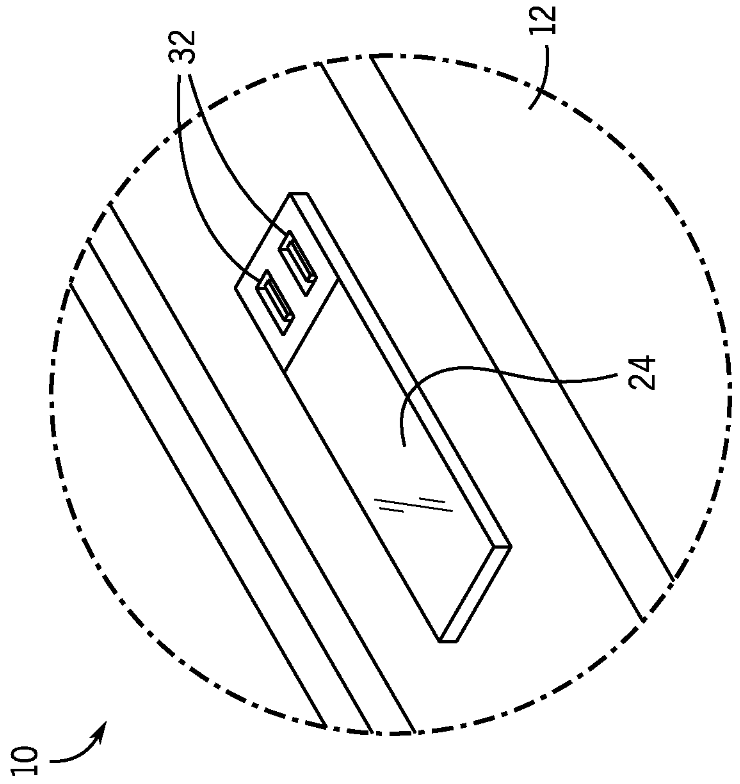
FIG. 3 is a detail view thereof, taken along line 3-3 of FIG. 1.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a luggage set or modular luggage system with a scale located inside the luggage modules in a position that enables accurate determination of the luggage weight including its contents and a connector system to latch luggage modules together.

Each luggage module generally has a luggage body with sidewalls and a lid that moves between a closed position and an open position. The luggage body and lid define a storage compartment therein and exterior surfaces on the sidewalls.

The scale or load sensor location is not particularly limited. The scale may have a digital display visible on the top to display the measured weight. The digital scale may be battery operated. The battery may be placed inside of the case, such as under or adjacent to the display monitor. In some cases, the scale may not require batteries to operate. In some embodiments, the scale may audibly announce the weight indicated by the scale.

Each luggage unit or case may have a locking frame comprising two parallel tubes or bars at the bottom of the luggage with an opening and a spring-loaded pin configuration. The locking frame may have wheels mounted thereto. The bars are operative to lock luggage units together. The locking frame connects luggage units when the bars of a first luggage unit are pushed forward to couple with the bars of another luggage unit. In some cases, the bars may slide forward into the bars of the second luggage unit and the bars of the second luggage unit may slide forward into the bars of a third luggage unit, forming a moveable cart. In some embodiments, the locking frame may comprise latches instead of, or in addition to, bars.

The bars may be activated with an actuator such as a handle, button, or lever, or a combination thereof, located on the back of the luggage unit that may be pressed downward to lock luggage units together. The handle may be slidably extending and substantially U-shaped with a base and legs, generally inverted on the luggage body. To unlock the units and retract the bars, the traveler may pull the handle up, i.e., reverse actuation. Each luggage unit may have its own handle to activate the connecting bars. In some embodiments, the activator device may be a button.

To use the inventive luggage, the traveler may pack clothes into the luggage and press a switch mechanism such as a button on the display read the scale. The traveler may push down a handle to lock the luggage units together. To unlock the units, the traveler may pull the handle up.

The method of manufacture is not particularly limited. An existing set of luggage may be modified by wiring a battery-operated scale and display monitor into at least one suitcase.

Figure 5:
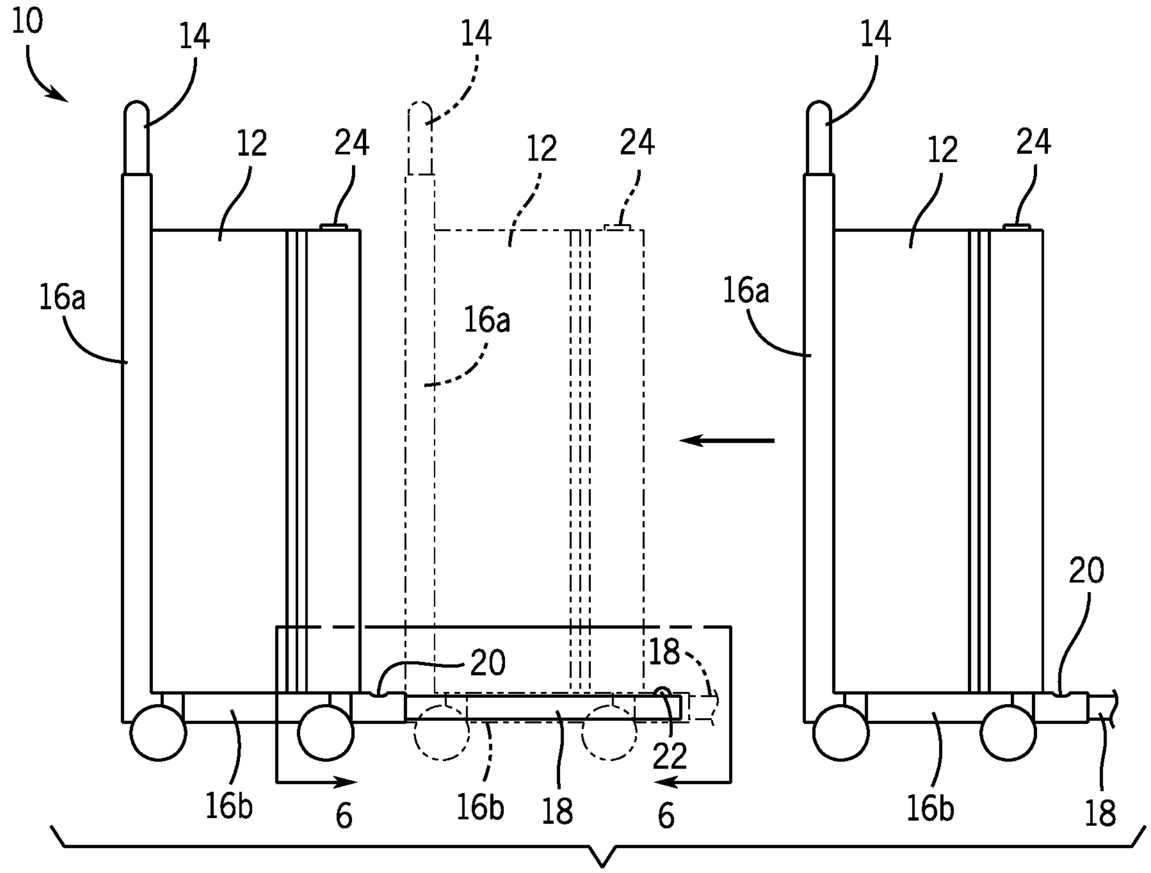
FIG. 5 is an exploded side elevation view thereof, shown in the locked position.
Figure 6:
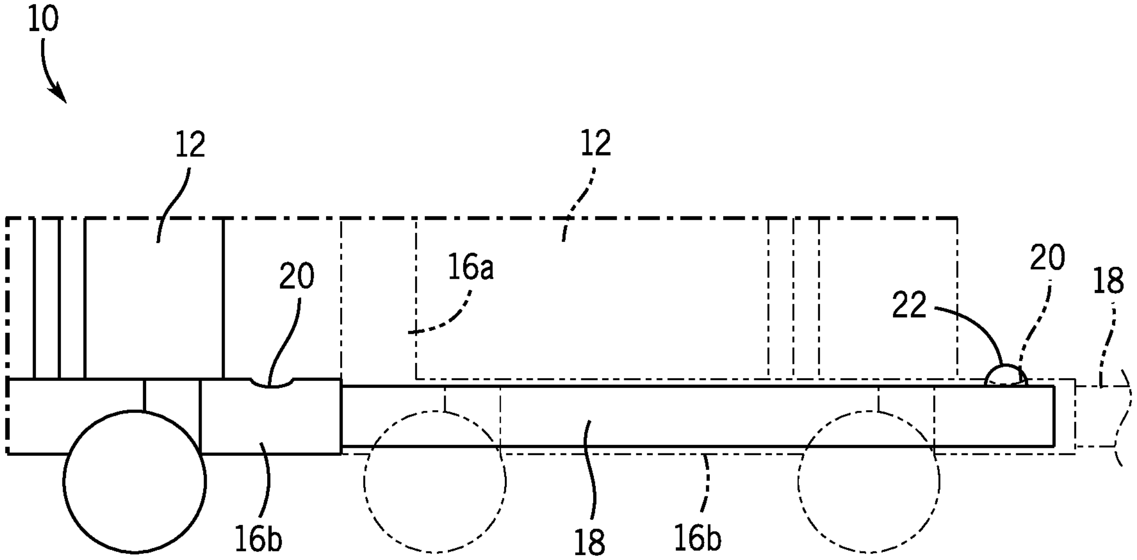
FIG. 6 is a detail view thereof, taken along line 6-6 of FIG. 5.
Figure 7:
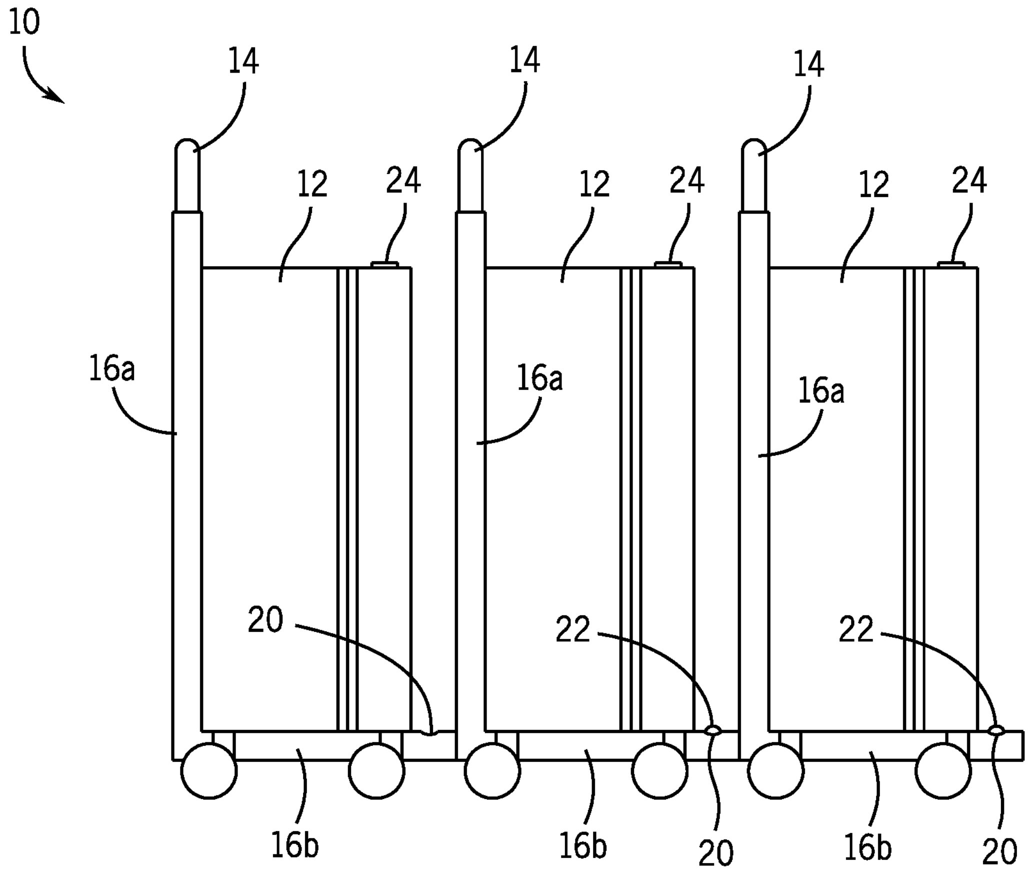
FIG. 7 is a side elevation view thereof, shown linked together in the locked position.

Referring to FIGS. 1 through 7, FIG. 2 illustrates a wheeled luggage 10 unit according to an embodiment of the present invention, having a storage compartment 12, a handle 14 extending from vertical frame portions 16*a*, and telescoping arms 18 extending from horizontal frame portions 16*b*. As more clearly shown in FIG. 3, the top of the luggage 10 includes a scale readout 24 and charging ports 32 electrically communicating with an internal power supply. The horizontal frame portions 16*b* and telescoping arms 18 have apertures 20 formed therein and pins 22 operative to latch the telescoping arms in position when aligned with an aperture 20. The telescoping arms 18 enable a user to couple luggage 10 units together, as shown in FIGS. 5 through 7. The luggage 10 unit further includes a scale 26 operative to weigh the contents 28 of the storage compartment, as shown in FIG. 2. An electrical connection 30 between the scale 26 and the scale readout 24 enables the traveler to determine the weight of the contents 28.

It should be understood, of course, that the foregoing relates to exemplary embodiments of the invention and that modifications may be made without departing from the spirit and scope of the invention as set forth in the following claims.

What is claimed is:

1. A modular luggage system, comprising:

a luggage module having:

a luggage body with a lid movable between an open position and a closed position, said luggage body and said lid defining a storage compartment therebetween;

a first frame coupled to and substantially coextensive with a first sidewall of the luggage body, having telescoping arms extending therefrom;

a second frame extending perpendicularly from the first frame, coupled to and substantially coextensive with a second sidewall of the luggage body;

a handle slidably housed within the second frame;

wheels rotatably mounted to the first frame; and a second luggage module having telescoping arms;

wherein the first frame comprises two parallel tubes configured to accommodate the telescoping arms of the second luggage module.

2. The modular luggage system of claim 1, wherein the handle is substantially U-shaped, with legs of the U housed within the second frame.

3. The modular luggage system of claim 1, further comprising a load sensor built into the first sidewall of said luggage body, said load sensor being operative to measure a weight of the luggage body and its contents; and a display coupled to the load sensor, viewable from an exterior of the luggage body, and operative to display the measured weight.

4. The modular luggage system of claim 3, wherein the display comprises a switch mechanism operative to activate the display when pressed.

5. The modular luggage system of claim 3, further comprising an internal power supply electrically coupled to the load sensor and the display; and charging ports electrically coupled to the internal power supply.

6. The modular luggage system of claim 3, wherein the load sensor audibly announces the measured weight.

7. The modular luggage system of claim 1, wherein the first frame has apertures formed therein and the telescoping arms have spring-loaded pins operative to latch into the apertures when aligned.

8. The modular luggage system of claim 1, wherein the telescoping arms extend such that the luggage modules lock together responsive to actuation of an activator device mounted on the luggage body, selected from the group consisting of: the handle, a button, a lever, and a combination thereof.

9. The modular luggage system of claim 8, wherein the luggage modules unlock and the telescoping arms retract responsive to reversing actuation of the activator device.

* * * * *